Sept. 14, 1965  M. RAPPAPORT  3,206,062
TABLET COUNTER AND PACKAGING UNIT
Filed Sept. 6, 1962  2 Sheets-Sheet 1
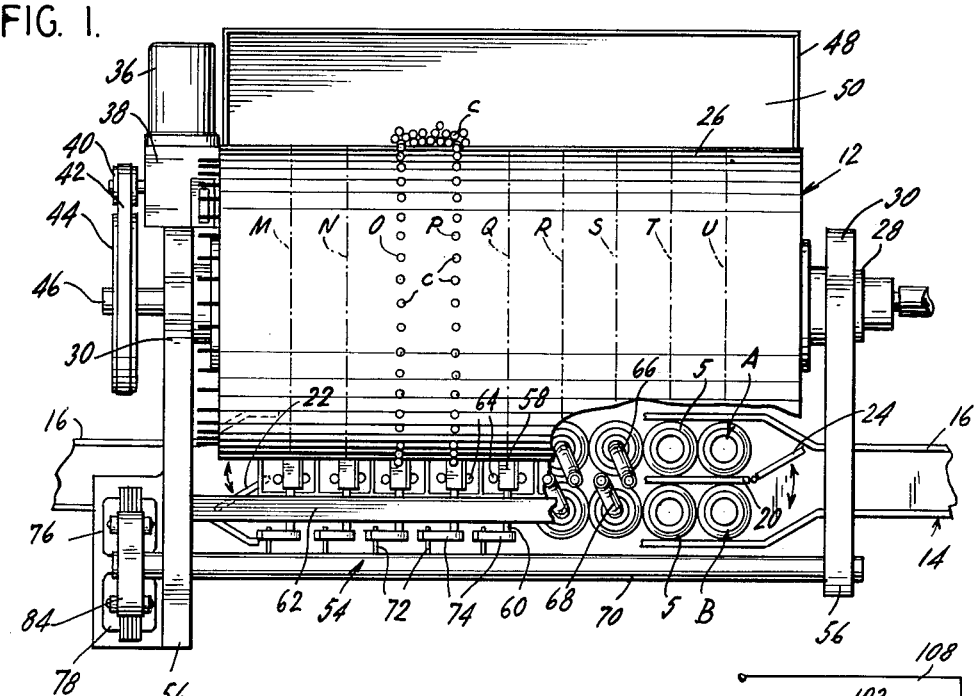
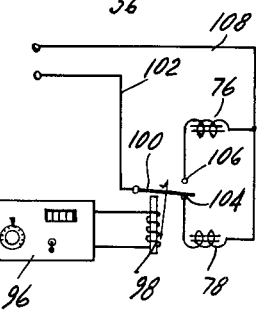
FIG. 5.
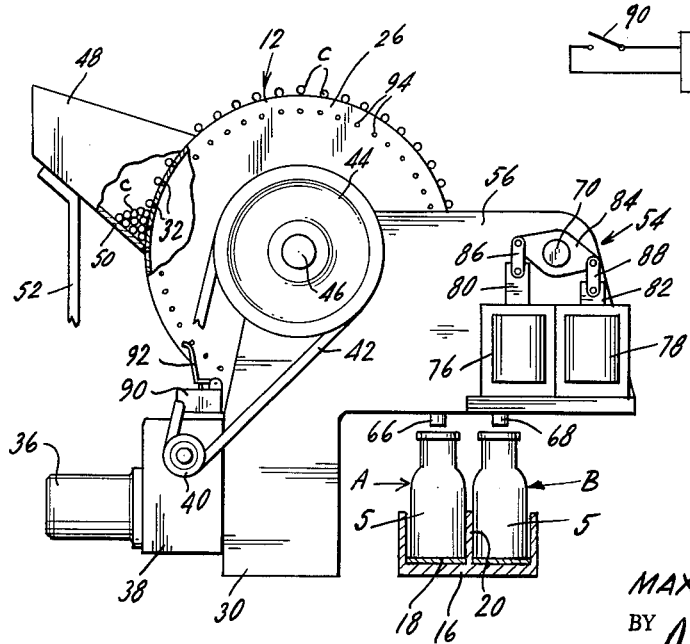
FIG. 2.
INVENTOR.
MAX RAPPAPORT
BY Amster & Levy
ATTORNEYS

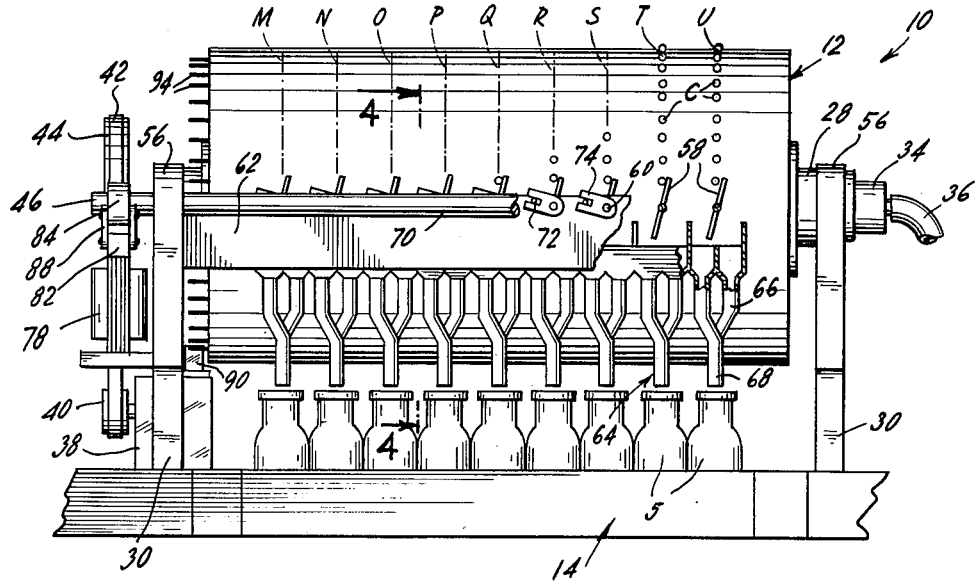
FIG. 3.
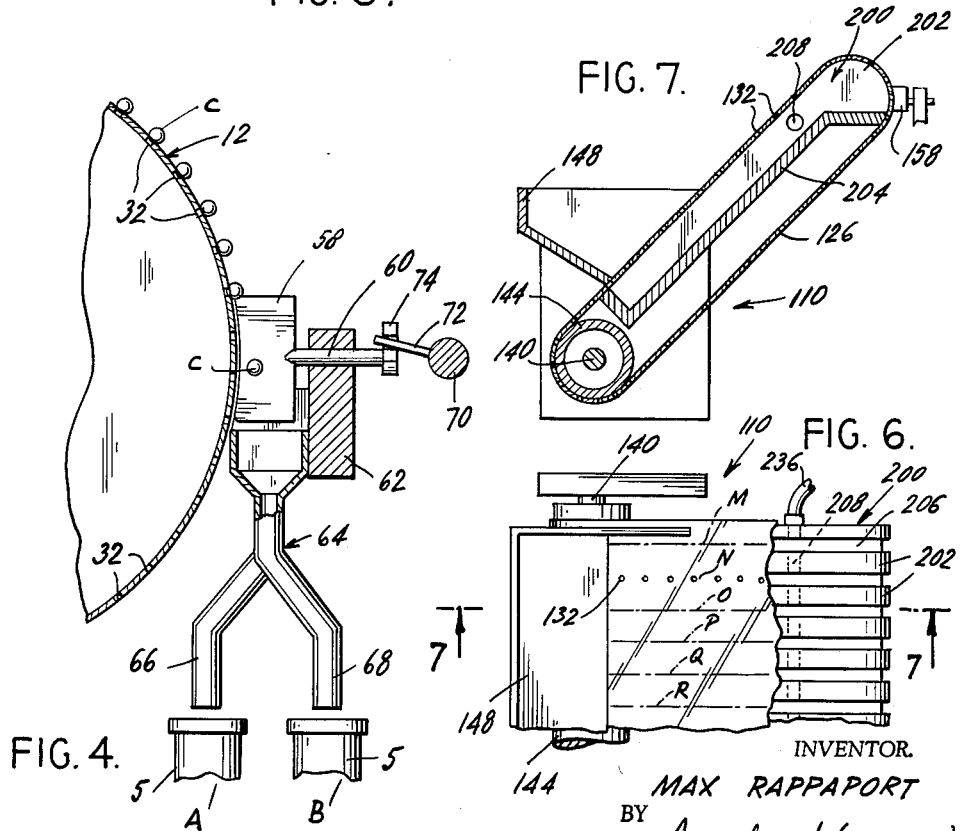
INVENTOR.
MAX RAPPAPORT
BY Amster & Levy
ATTORNEYS 3,206,062
TABLET COUNTER AND PACKAGING UNIT
Max Rappaport, 406 Elm Ave., River Edge, N.J.
Filed Sept. 6, 1962, Ser. No. 221,748
5 Claims. (Cl. 221—7)

The present invention relates generally to packaging mechanisms and specifically to a machine for counting and bottling small items such as pharmaceutical tablets.

It is customary in counting and packaging devices to provide transport means for empty containers arranged in two rows and in cooperaing relationship with a counting mechanism. Tablets in precounted batches, are released from the counting mechanism into a first group of containers in the first one of the two rows. These containers are then transported out of the machine while the counter delivers tablets to a corresponding group of containers in the second row. At the same time the transport mechanism are effective to bring a further group of empty containers into the loading position in the first row. The process continues alternatively filling groups in the first row and in the second row.

There are two general types of counting mechanisms which are currently employed in machines of this type. The first type of counter employs a machined depression formed in a counting surface which, when filled, contains a given number of tablets. Means are provided to deposit the tablets on the surface in which the slots are formed and further means are provided to remove excess tablets. It is usually required that an operator superintend the operations to insure that each depression is completely filled. In practice, it is often found that the slots are made slightly larger than theoretically necessary to give an overcount to the customer, therefore, to avoid any likelihood of a short count. Furthermore, arrangements of this type require new counting surfaces to be machined for each new size tablet or for each different count of tablets. Still further, although such systems have been used fairly effectively, the speed of counting and delivery of groups of precounted tablets is inherently limited by the structures of the mechanism. The second type of generally employed counters utilizes electronic counting mechanisms which registers by means of a photoelectric cell, for example, the passage of each individual tablet and, at a predetermined count, releases the tablets to the filling station of the packaging device. Although this system is far more flexible than the machined slot system, it includes inherent inaccuracies since the tablets are not presented to the photoelectric cell or other measuring device in precise and uniform position. For example, it is quite possible for two or more tablets to be registered as only one due to the shadow effect of one tablet on the other. Of course, as production rate increases, the inaccuracies similarly increase.

Accordingly, it is an object of the present invention to provide an accurate and efficient tablet counter for use in packaging pharmaceutical tablets. Specifically, it is an object of the present invention to provide a packaging and counting mechanism which is automatic in operation, independent of the size of tablets being counted, flexible with regard to the number of tablets to be packaged in each container and which is capable of relatively high speed production.

It is further within the contemplation of the present invention to provide such a device which is highly accurate and which will not lose its accuracy upon an increase in production rate.

It is still a further object of the present invention to provide a tablet counter which is adaptable to handle tablets of a variety of sizes and a variety of numbers such that there is little or no down time for the changeover operations.

In accordance with the present invention, there is provided a counter in a packaging machine, which machine may include container transfer mechanisms for packing parallel rows of containers at a filling station to be alternatively supplied with precounted numbers of tablets from the counter. The counter comprises a hollow cylindrical drum mounted by bearing means for rotation about its central axis. Pressure-reducing means are connected to the drum for lowering the pressure within the drum. A plurality of circumferential rows of equally spaced pick-up openings are formed in the surface of the drum and are adapted to hold tablets thereto by the decrease of pressure within the drum as compared with the ambient. A tablet-storing hopper is positioned in immediate proximity of the drum from which tablets are picked up at the openings as the drum is rotated. Drive means are provided for producing such rotation. In addition, diverter means are positioned adjacent the drum at a location removed from the hopper and are located to engage tablets at the pickup openings as the drum is rotated. Guide means are provided cooperating with the diverter means to guide the diverted tablets to the filling station. Counter means for registering the number of tablets diverted are engaged with the rotating drum to measure the rotation of the drum and thereby to count diverted tablets. Furthermore, means operable in response to a signal from the counter means are provided for directing tablets from one filling station to another to alternatively deposit preselected numbers of tablets in parallel rows of containers.

The above brief description, as well as further objects, features and advantages of the present invention will be best appreciated by reference to the following detailed description when taken in conjunction with the accompanying drawings wherein:

FIG. 1 is a plan view of a tablet counter and packaging machine constructed according to the present invention, with portions broken away for the sake of clarity;

FIG. 2 is an end elevational view of the device shown in FIG. 1 with portions broken away and in section;

FIG. 3 is a side elevational view of the device shown in FIG. 1 with portions broken away and in section;

FIG. 4 is an enlarged sectional view taken along the line 4—4 of FIG. 3 looking in the direction of the arrows;

FIG. 5 is a schematic representation of the counter and control circuitry incorporated in the present device;

FIG. 6 is a partial view, with sections broken away of a second embodiment of the present invention; and, FIG. 7 is a sectional view taken along the line 7—7 of FIG. 6 and looking in the direction of the arrows.

Referring now specifically to the drawings, there is shown in FIGS. 1, 2 and 3, a tablet counter and packaging unit, generally designated by the numeral 10, comprising a counter 12 in combination with container conveyance and indexing means 14.

Prior to describing the counter according to the present invention, description will be made of the conveyance and indexing means. A channel 16, generally U-shaped in cross-section, is mounted on the frame of the machine and is provided with means for moving a series of containers, such as the bottles 5, into position to be filled in the packaging machine 10. As may be best seen in cross-sectional view of FIG. 2, the conveyance means may include a moving belt 18, at the base of the channel 16 or may alternatively comprise any standard conveyance mechanism. Both the entry and exit of the channel 16 into the machine 10 provides a path for a single row of containers 5. In the area immediately adjacent the counter 10, which comprises the filling station of the machine, the channel 16 is widened to a two-row width with a center separation wall 20 between the two rows. For convenience, these two rows are labeled A and B respectively in the drawings. Indexing means is provided at the entry portion of the two-row section of the channel 16, best seen in FIG. 1, and comprises a pivotally mounted gate 22 which is swingable through approximately 90 degrees in order to direct containers into one or the other of the two rows A, B. A similar gate 24 is provided at the exit end of the two-row portion of the channel 16 and is effective to halt travel of the containers out of one of the rows while permitting the containers in the other row to be moved outwardly of the machine 10 through the channel 16. In a machine according to the present design, filling of the containers takes place alternatively in row A and then in row B, with the containers in row B being removed from the filling station and being replaced by empty containers while the filling process is in progress in row A. The gates 22, 24 are then indexed to their second position and the converse filling and transfer operation occurs.

The counter mechanism 12 comprises a rotating hollow drum 26 which is mounted for rotation about its central axis within the bearings 28 which in turn are supported on the frame of the machine at the upright members 30. The cylindrical surface of the drum 26 is formed with a plurality of spaced apart circumferential rows, schematically illustrated in the drawings as M, N, O, P, Q, R, S, T and U, each of which rows is formed of a plurality of equally spaced small pick-up openings 32. The pick-up openings 32 are smaller than the size of the capsules c, such that the capsules c may be seated against the opening 32 but may not pass therethrough into the interior of the drum 26. It is by this means that the drum 26 is employed to pick up selective numbers of capsules c and transport them from a pick-up location at one side of the drum to a discharge location at the other. The drum 26 is conveniently driven through a motor 36, a gear box 38 and its output pulley 40, about which is connected a pulley belt 42 which in turn is connected to a pulley 44 mounted on the shaft 46 which is connected through the bearing 28 to the drum 26. Thus, upon rotation of the motor 36, the drum 26 is rotated.

A capsule supply hopper 48, having an inclined bottom wall 50, is mounted on supports 52 longitudinally of and immediately adjacent the rotating drum 26. It will be appreciated that a supply of capsules c contained within the hopper 48 will move downwardly along the inclined bottom wall 50 into contact with the cylindrical surface of the drum 26. As the drum 26 is rotated, and as the pressure within the drum 26 is kept below the pressure of the ambient, capsules c will contact the cylindrical surface of the drum 26 and will become engaged with the pick-up openings 32. It will be further appreciated that the provisions of means to unloosen the capsules c from their securement to the drum 26 upon rotation of the drum, means to guide the unloosened capsules into containers, and means to measure the rotation of the drum and thereby count capsules would complete the machine 10. Such means are provided as described below.

A diverting mechanism, generally designated by the numeral 54 is mounted on the frame of the machine on extensions 56 of the supports 30 and comprises a plurality of movable baffle plates 58, one for each of the rows M through U. The baffle plates are arranged in alignment with the individual rows of openings 32 to knock capsules c from the surface of the rotating drum 26 first to one side for loading in row A at the loading station and then to the other for loading in row B. The baffle plates 58 are secured to shafts 60 which are mounted for rotation in the cross beam 62 bridging the support extensions 56 at a point approximately 180 degrees around the drum 26 from the storage hopper 48. As may be best seen in FIG. 4, the baffle plates 58 have an arcuate front surface corresponding to the arc of the surface of the drum 26 and are positioned with the shaft 60 exactly in line with its respective row M through U such that, upon pivoting motion of the shaft 60, capsules will be diverted alternatively from one side or the other of the baffle plates 58. Extending downwardly and mounted on the cross-beam 62 are a plurality of pairs of guide tubes, generally designated by the numeral 64, each of which includes a first guide tube 66 for row A of the loading station and a second guide tube 68 for row B of the loading station. As may be seen on the right hand portion of FIG. 3, the upper ends of the guide tubes 64 are formed with two throat sections which receive capsules c as they are removed from the surface of the drum 26 by the baffle plates 58. In the arrangement as shown in FIGS. 3 and 4, the capsules will be diverted into guide tubes 68 and then into row B of the loading platform. If the baffle plates were rotated counterclockwise past the vertical position, the capsules c would be, of course, diverted into tubes 66 of the guiding tube means and, therefore, into the bottles 5 positioned in row A of the loading station.

Means are provided in the diverting mechanism 54 for the simultaneous movement of each of the baffle plates 58 from their orientation to divert capsules from one of the rows of the loading platform to the other. These means include a simple rotatable shaft 70 mounted within the support extensions 56 for rotation about its own axis, which shaft has extended outwardly therefrom, a number of pins 72, equal in number to the number of baffle plates 58. The pins 72 engage with bifurcated arms 74 which are rigidly connected to the baffle plate shafts 60. As may be seen in FIGS. 3 and 4, the pins 72 are engaged between the bifurcated portion of the arms 74 and upon pivotal motion of the shaft 70, the pins 72 are effective to swing the arms 74 and therefore the baffle plate shafts 60 through a rotational motion. It will be appreciated that upon rotation of the shafts 70 in a counterclockwise rotation as shown in FIG. 4, the baffle plates 58 will be moved from their orientation as shown in FIG. 3 through a counterclockwise rotation to direct capsules c to the guide tubes 66 rather than the guide tubes 68. The shaft 70 is rotated through its alternative clockwise and counterclockwise movements by means of the indexing mechanisms best seen in FIG. 2 which include a pair of solenoids 76, 78 and their associated cores 80, 82 which are connected to the opposite ends of a cross-arm 84 on the shaft 70 through the connecting links 86, 88. It will be appreciated that the energization of the solenoid 76 will draw the core 80 downwardly thereby to pivot the cross-arm 84 and the shaft 70 through a counterclockwse direction. Conversely, the energization of the solenoid 78 will cause the shaft 70 to be pivoted in a clockwise direction. Automatic means are provided to activate the indexing mechanisms at the end of each packaging cycle as determined by the placement of the desired number of capsules within the bottles or containers 5.

The number of capsules c deposited in each of the containers 5 is counted by measuring the rotation of the drum 26. In the present illustrative embodiment, this counting operation is provided by means of a simple microswitch 90 and its contact arm 92 which is engaged with a series of pins 94 which are secured to and extend laterally from one end of the drum 26. In the present illustrative embodiment, one pin 94 is provided for each of the pick-up openings 32 in one of the rows M through U such that the microswitch 90 is activated once for each capsule which is deflected by the baffle plate 58. It is possible, of course, to use a lesser number of pins 94. For example, half the number of pins could be employed if the machine were to be used for packaging only even numbers of capsules.

Referring now to FIG. 5, there is schematically shown the microswitch 90 connected to a counter 96 which may be pre-set to alternatively energize and deenergize a solenoid 98 upon the completion of a predetermined number of closings of the microswitch 90. Upon the alternative energization and deenergization of the solenoid 98, the switch arm 100, connected to one side 102 of a power line, is moved between a first contact 104 and a second contact 106. As seen in FIG. 5, the contacts 104, 106 are connected to the solenoids 78, 76 respectively, which in turn are connected to the other side 108 of the power line. Thus, upon movement of the contact arm 100 from the first contact 104 to the second contact 106, the solenoids 76, 78 will be alternatively activated, thereby indexing the shaft 70 and ultimately the baffle plates 58. Similar means are provided connected to the circuitry of FIG. 5 for alternatively opening and closing the gates 22, 24 of the conveyor means 14 to alternatively retain containers 5 in the first row A and release containers in the second row B at the loading station of the machine 10.

The operations of the pill counting and packaging machine 10 will be best understood by considering the following description of the overall operations of the machine. With a supply of capsules contained within the hopper 48 and a supply of bottles or containers 5, set into the conveyor means 14, rotation of the drum 26 is instituted by power delivered from the motor 36. At the same time, vacuum means are provided to lower the pressure within the drum 26 such that the individual capsules c adhere to the surface of the drum 26 at the openings 32. Upon rotation of the drum from the pick-up location within the hopper, capsules c are carried to a further location where they engage the baffle plates 58 which are set at an angle to the path of movement such that the capsules are diverted into the guiding means 64. The counting mechanisms which register the rotation of the drum 26 are effective, after the registration of a predetermined amount of rotation of the drum 26, to change the orientation of the baffle plates 58 to direct capsules from a first set of guide tubes to a second set of guide tubes and, at the same time, to release containers 5 held in row A of the conveyor means 14 and to replace those filled containers with empty containers while retaining the containers in row B at locations immediately under the second set of guide tubes such that capsules will be delivered from the baffle plates 58 through the guide tubes to the containers 5 in row B. Further filling of the containers 5 produces similar results alternately filling containers in row A and row B.

In FIGS. 6 and 7 there is illustrated a portion of a machine 110 which includes a conveyor belt 126 rather than the drum 26 in the machine 10. A hopper 148 of basically similar construction to the hopper 48 is provided in engagement with the conveyor 126 and the conveyor is driven by a wheel 144 and drive shaft 140 at the lower end of the conveyor 126. The upper end of the conveyor 126 is guided about a supporting structure 200 which includes a series of vertical walls 202 mounted on a supporting base 204 and has longitudinal openings 206 therebetween. A vacuum tube 236 is connected to the supporting mechanisms 200 and the spaces 206 are interconnected with each other through the openings 208 through the walls 202 such that the reduction of pressure in the openings 206 is uniform. The conveyor 126 is provided with a plurality of rows M, N, O, P, Q, R, etc. of small pick-up openings 132 which are analagous to the openings 32 in the drum 26. It will be appreciated that the conveyor 126 will pick up capsules c from the hopper 148 by engagement at the openings 132 upon rotation of the conveyor 126. Baffle plates 158 are provided at a location removed from the hopper 148 which provide a function identical to that of the baffle plates 58 in the machine 10. Other portions of the machine 10 are similar and provide similar functions to those described above in connection with the counting and packaging device 10.

It will be appreciated that the foregoing describes an invention for use in packaging small items and in particular pharmaceutical capsules and the like. The counter employed in the machine according to the present invention offers a high degree of reliability in providing accurate capsule counting at high speeds and inherently includes adaptability for handling capsules of different sizes and for packaging any desired number of capsules in each container.

Although the foregoing description describes only two presently preferred embodiments of the invention, other embodiments may be constructed which depart from the particular structures described, but which nonetheless incorporate the inventive concepts.

What I claim is:

1. In a tablet packaging machine, including a hollow, rotatable drum having a plurality of circumferential rows of tablet pick-up openings in its interior, means forming a tablet supply station and a tablet receptacle filling station located adjacent said drum and at spaced points of rotation therealong, and means operably connected to said drum interior for applying suction pressure at said pick-up openings to pick up tablets for delivery on said drum from said supply station to said filling station, the improvement comprising means at said filling station for removing tablets from said drum and guiding said removed tablets along at least two select paths into said filling station, said means comprising a plurality of spaced plates, each of which is rotatably mounted in close proximity to said drum surface and in the circumferential line of movement of a drum circumferential row of tablet pick up openings for dislodging tablets from said drum, and means connected to rotate said plates between two inclined operable positions for gravity feed of the removed tablets along one or the other of said select paths into said filling station.

2. A table packaging machine as claimed in claim 1 wherein the pick-up openings of each row are of a predetermined number for indexing the quantity of delivered tablets as a function of drum rotation, and including control means responsive to drum rotation operably connected to said means rotating said plates beween their operable positions for alternately changing said plate operable positions and the feed path into said filling station responsive to the quantity of tablets being fed to said filling station.

3. In a tablet packaging machine, including a hollow, rotatable drum having a plurality of circumferential rows of a predetermined number of tablet pick-up openings into its interior, means forming a tablet supply station and a tablet receptacle filling station located adjacent said drum and at spaced points of rotation therealong, and means operably connected to said drum interior for applying suction pressure at said pick-up openings to pick up tablets for delivery on said drum from said supply station to said filling station, the improvement comprising means at said filling station for removing tablets from said drum and guiding said removed tablets along at least two select paths into said filling station, said means comprising a plurality of spaced plates, each of which is rotatably mounted in close proximity to said drum surface and in the circumferential line of movement of a drum circumferential row of tablet pick-up openings for dislodging tablets from said drum, counting means responsive to drum rotation, and control means operably connected between said counting means and said plates for rotating said plates between their operable positions for alternately changing said plate positions and the feed path into said filling station responsive to the quantity of tablets being fed to said filling station.

4. A tablet packaging machine as claimed in claim 3 wherein circumferentially spaced axially extending pins are provided on the end of said drum, and said counting means includes a contact arm mounted in the path of movement of said extending pins and adapted to be actuated by contact with said pins during drum rotation to thereby operate said control means as a function of drum rotation.

5. In a tablet packaging machine, including a hollow, rotatable drum having a plurality of circumferential rows of a predetermined number of tablet pick-up openings into its interior and a plurality of circumferentially spaced axially extending pins on an end thereof, means forming a tablet supply station and a tablet receptacle filling station located adjacent said drum and at spaced points of rotation therealong, and means operably connected to said drum interior for applying suction pressure at said pick-up openings to pick up tablets for delivery on said drum from said supply station to said filling station, the improvement comprising means at said filling station for removing tablets from said drum and guiding said removed tablets along at least two select paths into said filling station, said means comprising a plurality of spaced plates, each of which is rotatably mounted in close proximity to said drum surface and in the circumferential line of movement of a drum circumferential row of tablet pick-up openings for dislodging tablets from said drum, counting means including a contact arm mounted in the path of movement of said axially extending pins and adapted to be actuated by contact with said pins during drum rotation, and control means operably connected between said counting means and said plates for rotating said plates between their operable positions for alternately changing said plate positions and the feed path into said filling station responsive to the quantity of tablets being fed to said filling station.

References Cited by the Examiner

UNITED STATES PATENTS

| | | | |
|---|---|---|---|
| 1,371,517 | 3/21 | Oliver | 221—211 |
| 1,485,099 | 2/24 | Wahl | 221—7 X |
| 1,762,671 | 6/30 | Slathar | 221—211 |
| 2,324,823 | 7/43 | Chilson et al. | 221—211 X |
| 2,384,820 | 9/45 | Dodwell | 221—211 |
| 2,523,517 | 9/50 | Potter. | |
| 2,632,588 | 3/53 | Hoar | 221—13 X |
| 3,045,910 | 7/62 | McLearn. | |
| 3,081,588 | 3/63 | Klapes et al. | 53—78 |

RAPHAEL M. LUPO, *Primary Examiner.*

KENNETH N. LEIMER, LOUIS J. DEMBO, *Examiners.*